United States Patent
Everaerts et al.

(10) Patent No.: US 7,084,209 B2
(45) Date of Patent: *Aug. 1, 2006

(54) BLOCK COPOLYMER HOT-MELT PROCESSABLE ADHESIVES, METHODS OF THEIR PREPARATION, AND ARTICLES THEREFROM

(75) Inventors: Albert I. Everaerts, Oakdale, MN (US); JingJing Ma, Woodbury, MN (US); Francois C. D'Haese, Ghent (BE)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/838,312

(22) Filed: May 4, 2004

(65) Prior Publication Data

US 2004/0202881 A1 Oct. 14, 2004

Related U.S. Application Data

(62) Division of application No. 09/646,975, filed as application No. PCT/US98/27776 on Dec. 29, 1998, now Pat. No. 6,734,256.

(51) Int. Cl.
*C08L 31/02* (2006.01)
*C08F 20/10* (2006.01)

(52) U.S. Cl. .................. 525/98; 525/299; 525/308; 525/272

(58) Field of Classification Search .............. 525/98, 525/299, 308, 272
See application file for complete search history.

(56) References Cited

U.S. PATENT DOCUMENTS

| | | | |
|---|---|---|---|
| 3,239,478 A | 3/1966 | Harlan, Jr. | |
| 3,454,516 A * | 7/1969 | Victorius | 524/522 |
| 3,639,517 A | 2/1972 | Kitchen et al. | |
| 3,932,328 A | 1/1976 | Korpman | |
| 3,985,830 A * | 10/1976 | Fetters et al. | 525/192 |
| 4,221,884 A | 9/1980 | Bi et al. | |
| 4,444,953 A | 4/1984 | St. Clair | |
| 4,554,324 A | 11/1985 | Husman et al. | |
| 4,556,464 A | 12/1985 | St. Clair | |
| 4,780,367 A | 10/1988 | Lau et al. | |
| 5,098,959 A | 3/1992 | McGrath et al. | |
| 5,296,547 A | 3/1994 | Nestegard et al. | |
| 5,395,884 A | 3/1995 | Gnanou | |
| 5,399,627 A * | 3/1995 | Diehl et al. | 525/314 |
| 5,403,658 A * | 4/1995 | Southwick et al. | 428/355 BL |
| 5,476,904 A | 12/1995 | Heim et al. | 528/299 |
| 5,610,238 A | 3/1997 | Himes et al. | 525/314 |
| 5,639,831 A | 6/1997 | Himes et al. | 525/314 |
| 5,670,577 A | 9/1997 | Dawson, Jr. | 525/95 |
| 5,677,387 A | 10/1997 | Bayard et al. | |
| 5,679,762 A | 10/1997 | Yoshida et al. | 528/364 |
| 5,686,534 A | 11/1997 | Bayard et al. | |
| 5,763,548 A | 6/1998 | Matyjaszewski et al. | 526/135 |
| 5,773,506 A | 6/1998 | Nestegard et al. | |
| 5,886,112 A | 3/1999 | Vuillemin et al. | |
| 5,919,867 A | 7/1999 | Yasuda et al. | |
| 6,114,482 A | 9/2000 | Senninger et al. | |
| 6,734,256 B1 * | 5/2004 | Everaerts et al. | 525/299 |
| 6,806,320 B1 * | 10/2004 | Everaerts et al. | 525/330.3 |

FOREIGN PATENT DOCUMENTS

| | | |
|---|---|---|
| DE | 196 31 422 | 2/1998 |
| EP | 0 130 087 A1 | 1/1985 |
| EP | 0 349 232 A2 | 6/1988 |
| EP | 0 286 376 A2 | 10/1988 |
| EP | 0 349 270 B1 | 1/1990 |
| EP | 0 457 566 A2 | 11/1991 |
| EP | 0 479 311 | 4/1992 |
| EP | 0 921 170 A1 | 9/1999 |
| GB | 2 305 927 A | 4/1997 |
| JP | 64-24879 | 1/1989 |
| JP | 2-103277 | 4/1990 |
| JP | 9-324165 | 12/1997 |
| JP | 10-8012 | 1/1998 |
| JP | 10-8013 | 1/1998 |
| JP | 10-25459 | 1/1998 |
| JP | 10-25460 | 1/1998 |
| JP | 10-30078 | 2/1998 |
| JP | 10-8011 | 11/1998 |
| WO | WO 97/18247 | 5/1997 |
| WO | WO 98/01478 | 1/1998 |

* cited by examiner

*Primary Examiner*—James J. Seidleck
*Assistant Examiner*—Olga Asinovsky
(74) *Attorney, Agent, or Firm*—Nancy M. Lambert

(57) ABSTRACT

Hot-melt processable adhesive, such as pressure-sensitive-adhesive (PSA) or heat-activatable adhesive, compositions of the present invention possess a broad formulation latitude and adequate cohesive strength after application for use in high performance applications. Hot-melt processable adhesives of the invention comprise at least one block copolymer comprising at least two A blocks and at least one B block. The A and B blocks are derived from monoethylenically unsaturated monomers, which monomers result in saturated polymer backbones without the need for subsequent hydrogenation upon their polymerization. Preferably, the block copolymer is a (meth)acrylate block copolymer.

16 Claims, No Drawings

BLOCK COPOLYMER HOT-MELT PROCESSABLE ADHESIVES, METHODS OF THEIR PREPARATION, AND ARTICLES THEREFROM

CROSS REFERENCE TO RELATED APPLICATIONS

This application is a divisional of U.S. application Ser. No. 09/646,975, filed Sep. 25, 2000 now U.S. Pat. No. 6,734,256; which was a national stage filing under 35 U.S.C. 371 of PCT/US98/27776, filed Dec. 29, 1998, which international Application was published by the International Bureau in English on Jul. 6, 2000.

FIELD OF THE INVENTION

The present invention relates to block copolymer hot-melt processable adhesives, methods of their preparation, and articles having a coating of the adhesive applied thereto.

BACKGROUND OF THE INVENTION

Among adhesive chemistries, (meth)acrylics (i.e., methacrylate polymers and acrylate polymers) are one of the most prominent. (Meth)acrylics have evolved as a preferred class of adhesives due to their durability, permanence of properties over time, and versatility of adhesion, to name just a few of their benefits.

Traditionally, adhesives, such as (meth)acrylics, have been provided in organic solvent for subsequent application. Such adhesives are applied to a substrate and the solvent is then removed. Hot-melt adhesives advantageously reduce or eliminate the use of organic solvents in adhesives and their processing. Hot-melt adhesive systems are essentially 100% solid systems. Usually, such systems have no more than about 5% organic solvents or water, more typically no more than about 3% organic solvents or water. Most typically, such systems are free of organic solvents and water. Advantageously, by reducing the use of organic solvents, special handling concerns associated therewith are also reduced.

Hot-melt processable adhesives have a sufficient viscosity upon melting, such that they can be hot-melt processed (e.g., applied to a substrate). By adjusting the processing temperature and components of an adhesive, the viscosity of the adhesive can be readily tailored for application. For high performance applications (i.e., those requiring relatively strong cohesive strength, such as shear holding strength), some method of increasing the cohesive strength of applied hot-melt adhesives is often needed (e.g., post-crosslinking or moisture-curing).

For example, energy sources, such as electron beam (e-beam) or ultraviolet (UV) radiation, are commonly used to chemically crosslink adhesives after application. These methods, however, often require an additional processing step and, thus, result in decreased processing efficiency. Furthermore, e-beam is not always desired because it is expensive and can cause damage to some backings when the adhesive is used in a tape. Similarly, UV-radiation has its limitations as a crosslinking energy source. For example, UV-radiation is often not able to be used effectively for crosslinking relatively thick adhesives due to the need for UV-radiation to penetrate throughout the entire thickness of the adhesive. As such, certain fillers and pigments cannot be used in adhesives when UV-crosslinking is used because they potentially interfere with penetration of UV-radiation therethrough.

Another disadvantage of chemically crosslinking a polymer is the irreversible nature of such chemical crosslinks. Variations in polymer morphology may obviate the necessity for chemical crosslinking of a polymer, however. For example, block copolymers advantageously show phase segregation causing domains to form, which domains serve as physical crosslinking and reinforcement sites. Thus, block copolymers do not require additional steps that involve chemical crosslinking (e.g., post-crosslinking or moisture-curing). However, the degree and type of physical crosslinking may still not be adequate for certain high performance applications that require adhesives with adequate cohesive strength after application.

Molecular structure and morphology of polymers is often dictated by their polymerization methods. It is known that (meth)acrylate block copolymers can be prepared through a variety of living anionic and living free radical polymerization (also referred to as controlled free radical polymerization) techniques.

For example, U.S. Pat. No. 5,686,534 (Bayard et al.) and U.S. Pat. No. 5,677,387 (Bayard et al.) demonstrate the synthesis of homopolymers and block copolymers of (meth)acrylates or other vinyl monomers using living anionic polymerization. Block copolymers described therein include those having primary alkyl acrylate blocks with blocks of methacrylic or secondary or tertiary alkyl acrylate monomer or nonacrylic vinyl monomer. The block copolymers are said to be useful in the manufacture of elastomeric articles (e.g., injection-molded articles) and as additives in pressure-sensitive-adhesive (PSA) formulations.

PCT Publication No. WO 97/18,247 (Carnegie Mellon) describes the synthesis of homopolymers or copolymers through atom (or group) transfer radical polymerization (ATRP (or GTRP)). Copolymers prepared therefrom (including block and random copolymers) are purportedly useful in wide variety of applications, such as adhesives and as thermoplastic elastomers, for example. However, the block copolymers (triblock copolymers derived from monomers of styrene and (meth)acrylate monomers and triblock copolymers derived from monomers of methyl methacrylate and acrylate monomers) described therein are stated to be useful merely as thermoplastic elastomers.

These references do not teach how to make a hot-melt processable PSA utilizing such block copolymers. Yet, a number of references do describe (meth)acrylate block copolymers, some of which can be used in hot-melt processable PSAs. These references, however, typically synthesize the block copolymers using iniferter polymerization. The term iniferter refers to a chemical compound that has a combined function of being a free radical initiator, transfer agent and terminator. Photoiniferters are compounds in which light is used to generate the free radical iniferter species.

European Patent Publication No. 0 349 270 A2 (Minnesota Mining and Manufacturing Co.) describes the preparation of (meth)acrylate block copolymer PSA compositions and a method of making the same by use of an iniferter as a means of promoting, controlling and terminating polymerization. The resultant reinforced (meth)acrylate block copolymer and tackifier, if used, provides a PSA composition. If a tackifier is used, it is typically in an amount of 0 to 150 parts by weight based on 100 parts by weight of the block copolymer. Shear strength values for tapes prepared from the block copolymers therein and tested according to ASTM D3654 are all reported to be 133 minutes or less. These values are not large enough for many high performance applications.

Japanese Patent Publication HEI No. 10-30078 (Sekisui Chemical Co., Ltd.) describe adhesives prepared from (meth)acrylate block copolymers. The adhesives are purportedly useful as PSAs and hot-melt adhesives. It is taught that the block copolymers can be prepared by different polymerization methods, such as those that use iniferters as initiators, and including anionic polymerization and group transfer polymerization. Additives, such as adhesion-providing resins (e.g., tackifiers), are taught to be used according to need. Exemplifed therein are (A-B-A) triblock copolymers, wherein the A block is derived from methyl methacrylate and the B block is derived from ethyl acrylate. Further publications in related technologies of Sekisui Chemical Co., Ltd. include: Japanese Patent Publication HEI Nos. 9-324,165; 10-25,459; 10-25,460; 10-80,111; 10-80,112; and 10-80,113.

It has been difficult, however, to obtain clean, discrete block configurations in (meth)acrylate copolymers in the past when polymerizing using iniferters. Drawbacks of polymerization methods using iniferters include, for example: blocks having broad molecular weight distributions (i.e., as indicated by a relatively high polydispersity), poorly defined blocks/phase boundaries, relatively impure blocks, and inadequate control of molecular weight during polymerization. These drawbacks may present formulation difficulties and, thus, decrease the overall formulation latitude of such compositions. For example, when iniferters are used for polymerization, resulting block copolymers cannot be highly tackified without detrimentally affecting PSA properties of the composition. Accordingly, Japanese Patent Publication HEI No. 10-25,459 cautions that when the amount of adhesion-providing resin (i.e., tackifier) is greater than 40 parts by weight based on 100 parts by weight of the block copolymer, tackiness of the adhesive is decreased.

As stated above, block copolymers have been found useful in the preparation of PSAs. Furthermore, U.S. Pat. No. 3,239,478 (Harlan); U.S. Pat. No. 3,932,328 (Korpman); U.S. Pat. No. 4,780,367 (Lau); and U.S. Pat. No. 5,296,547 (Nestegard et al.) describe preparation of rubber-type block copolymers to provide PSAs. Some of these references also describe tailorability of the PSAs therein to provide hot-melt adhesives.

To date, typical block copolymers have predominantly utilized rubber-type materials, such as linear or branched polystyrene-polydiene-type materials. A drawback of these materials, however, is that the unsaturated hydrocarbon polydiene segments are often vulnerable to degradation, limiting the weatherability of these polymers. Although hydrogenation of the unsaturated hydrocarbon polydiene segments has improved weatherability of these materials (see, for example, U.S. Pat. No. 5,773,506 (Nestegard et al.)), rubber-based materials have not shown the durability, permanence of properties over time, and versatility of adhesion that are common to (meth)acrylics. Furthermore, the subsequent hydrogenation step decreases processing efficiency of the compositions. Thus, these types of block copolymers are not preferred.

In order to meet consumer demands for high performance applications, hot-melt processable adhesives must possess adequate cohesive strength after application. The increase in cohesive strength cannot come, however, at the expense of hot-melt processability. Furthermore, processing efficiency should not be compromised.

It would also be desirable to provide hot-melt processable adhesives, such as pressure-sensitive-adhesives, with broad formulation latitude. In order to provide broad formulation latitude, it is also desirable that the hot-melt processable adhesives comprise block copolymers having well-defined blocks.

SUMMARY OF THE INVENTION

In one embodiment, hot-melt processable adhesive compositions of the present invention comprise: 100 parts by weight of at least one block copolymer comprising at least two A blocks and at least one B block, wherein the A and B blocks are derived from monoethylenically unsaturated monomers, which monomers result in saturated polymer backbones without the need for subsequent hydrogenation upon their polymerization; and at least 40 parts by weight of at least one tackifier based on total weight of the block copolymer. Preferably, the adhesive composition is a pressure-sensitive-adhesive (PSA) composition. However, the adhesive composition may also be a heat-activatable adhesive composition.

Broad formulation latitude is possible in adhesives of the invention without sacrificing hot-melt processability or processing efficiency. For example, adhesives, such as PSAs, are obtainable even when elastomeric components in the composition consist essentially of the block copolymer. Thus, blending of more than one elastomeric component is not required in the present invention.

Preferably, the block copolymer comprises at least one of: (A-B-A) triblocks, -(A-B)$_n$- multiblocks, (A-B)$_n$- star blocks, and combinations thereof. Particularly preferred are the linear (A-B-A) triblock structures. Preferably, the block copolymer is a (meth)acrylate block copolymer. That is, at least one of the A and B blocks is derived from (meth) acrylate monomers. Advantageously, the adhesive can be formulated to have a cohesive strength of at least about 2,000 minutes when measured according to ASTM D 3654. Preferably, the adhesive has a cohesive strength of at least about 6,000 minutes when measured according to ASTM D 3654. More preferably, the adhesive has a cohesive strength of at least about 10,000 minutes when measured according to ASTM D 3654. Furthermore, the adhesive can be formulated to obtain zero shear displacement when tested according to Shear Displacement test described herein.

Typically, the A blocks are each polymers independently derived from a monoethylenically unsaturated monomer, which as a homopolymer has a glass transition temperature (Tg) of greater than about 20° C., preferably about 20° C. to about 200° C., and more preferably about 50° C. to about 150° C. Preferably, the monoethylenically unsaturated monomer is a (meth)acrylate monomer. However, the monoethylenically unsaturated monomer may also be a vinyl-terminated monomer, such as styrene.

For optimum hot-melt processability, preferably the A blocks each have a weight average molecular weight of less than about 50,000, more preferably about 3,000 to about 30,000, and most preferably about 5,000 to about 15,000.

Typically, the B block is a polymer derived from a monoethylenically unsaturated monomer, which as a homopolymer has a glass transition temperature (Tg) of less than about 20° C., preferably about −70° C. to about 20° C., and more preferably −60° C. to about 0° C. Preferably, the monoethylenically unsaturated monomer is a (meth)acrylate monomer.

For optimum hot-melt processability, preferably the B block has a weight average molecular weight of about 30,000 to about 500,000 grams per mole, more preferably about 70,000 to about 200,000 grams per mole.

In a preferred embodiment, the A block and B block are each independently derived from a monomer having a structure as follows:

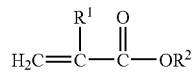

wherein:

R$^1$ is H or CH$_3$; and

R$^2$ is a hydrocarbon group, such that R$^2$ for the A block has a total number of carbon atoms differing by at least two from R$^2$ for the B block.

Preferably the block copolymer is polymerized via a method that leads to well-controlled block structures. In one embodiment, the block copolymer is polymerized via a living free-radical polymerization method. In another embodiment, the block copolymer is polymerized via living anionic polymerization. It is preferred, however, that the block copolymer is polymerized without using iniferters. Block copolymers prepared as such can advantageously be essentially free of iniferter residue.

Preferably, polydispersity of the block copolymer is about 2.0 or less, more preferably about 1.5 or less. Also preferred are block copolymers having relatively pure blocks. That is, preferably the A blocks are essentially free of segments derived from a monomer used to prepare the B block. Also, preferably the B block is essentially free of segments derived from a monomer used to prepare the A blocks.

Adhesives of the invention may further comprise at least one additive. Examples of additives include those selected from the group consisting of A-block compatible resins, (A-B) diblock copolymers, plasticizers, photocrosslinkers, stabilizers, pigments, fillers, and medicaments. For example, in one embodiment, the composition comprises an (A-B-A) triblock copolymer and an (A-B) diblock copolymer. It is preferred that the additive is compatible with the B block.

As compositions of the present invention advantageously have a broad formulation latitude, tackifiers may comprise about 60 parts by weight of the composition to about 140 parts by weight based on total weight of the block copolymer. The tackifier may even comprise as much as about 80 parts by weight of the composition to about 120 parts by weight based on total weight of the block copolymer.

In another embodiment, the invention comprises a hot-melt processable adhesive composition comprising: at least one block copolymer comprising at least two A blocks and at least one B block, wherein the A and B blocks are derived from monoethylenically unsaturated monomers, and wherein the adhesive has a cohesive strength of at least about 2,000 minutes when measured according to ASTM D 3654. The composition may further comprise at least one tackifier.

In another embodiment, the invention comprises a hot-melt processable adhesive composition comprising: at least one block copolymer comprising at least two A blocks and at least one B block, wherein the A and B blocks are derived from monoethylenically unsaturated monomers, and wherein the adhesive has a zero shear displacement when tested according to Shear Displacement test described herein. The composition may further comprise at least one tackifier.

In yet another embodiment, the invention comprises a hot-melt processable adhesive composition comprising: at least one block copolymer comprising at least two A blocks and at least one B block, wherein the A and B blocks are derived from monoethylenically unsaturated monomers, and wherein polydispersity of the block copolymer is about 1.5 or less. Preferably, polydispersity of the block copolymer is about 1.2 or less.

In yet another embodiment, the invention comprises a hot-melt processable adhesive composition comprising: at least one block copolymer comprising at least two A blocks and at least one B block, wherein the A and B blocks are derived from monoethylenically unsaturated monomers, and wherein the A blocks are each essentially free of segments derived from a monomer used to prepare the B block and wherein the B block is essentially free of segments derived from a monomer used to prepare the A blocks.

Still another embodiment of the invention comprises a hot-melt processable adhesive composition comprising: at least one block copolymer comprising at least two A blocks and at least one B block, wherein the A and B blocks are derived from monoethylenically unsaturated monomers, and wherein the block copolymer is essentially free of iniferter residue.

Another embodiment of the invention comprises a hot-melt processable adhesive composition comprising: at least one star block copolymer comprising A blocks and B blocks, wherein the A and B blocks are derived from monoethylenically unsaturated monomers, and wherein elastomeric components in the composition consist essentially of the star block copolymer.

Yet another embodiment of the invention comprises a hot-melt-processable adhesive composition comprising: at least one block copolymer comprising at least two A blocks and at least one B block, wherein the A and B blocks are derived from monoethylenically unsaturated monomers, and wherein the composition comprises an (A-B-A) triblock copolymer and an (A-B) diblock copolymer.

Still another embodiment of the invention comprises a hot-melt processable adhesive composition comprising: at least one block copolymer comprising at least two A blocks and at least one B block, wherein boundaries between microdomains comprising the A blocks and a continuous phase comprising the B blocks are essentially free of tapered structures.

In another embodiment, the invention comprises a hot-melt processable adhesive composition comprising: at least one block copolymer comprising at least two A blocks and at least one B block, wherein the A and B blocks are derived from monoethylenically unsaturated monomers, and wherein the block copolymer is polymerized via a living polymerization method. The composition may further comprise a tackifier.

The hot-melt processable adhesive may be used in a wide variety of applications. For example, a substrate may be at least partially coated with the adhesive composition of the invention. Advantageously, cohesive strength of the adhesive is adequate for many high performance applications without the need for subsequent chemical crosslinking. However, the adhesive composition may be chemically crosslinked. It is preferred, however, that the adhesive composition is thermally reversibly crosslinked (i.e., the composition is physically, not chemically, crosslinked).

Tapes may be prepared from adhesive compositions of the invention. In one embodiment, a tape comprises: a backing having a first and second side; and the hot-melt processable adhesive composition of the invention coated on at least a portion of the first side of the backing. The hot-melt processable adhesive composition may be hot-melt coated on the first side of the backing. Alternatively, although not preferred, the hot-melt processable adhesive composition may be solvent-coated on the first side of the backing.

Methods of preparing hot-melt processable adhesives of the present invention are also disclosed. For example, a method of preparing a hot-melt processable adhesive comprises the steps of: providing 100 parts by weight of at least one block copolymer comprising at least two A blocks and at least one B block, wherein the A and B blocks are derived from monoethylenically unsaturated monomers; and blending at least 40 parts by weight of at least one tackifier based on total weight of the block copolymer with the block copolymer.

The method may further comprise the step of polymerizing the block copolymer. In a preferred embodiment, the step of polymerizing the block copolymer does not use iniferters.

The method may also further comprise the step of applying the hot-melt adhesive to at least a portion of a substrate. In a preferred embodiment, the step of applying the hot-melt processable adhesive comprises hot-melt processing the hot-melt processable adhesive.

DETAILED DESCRIPTION OF THE INVENTION

The present invention is directed toward hot-melt processable adhesives comprising block copolymers. Adhesives of the present invention preferably comprise a major proportion of at least one block copolymer (more than one block copolymer of the present invention may be blended together) of the present invention with respect to the total elastomeric components.

"Elastomeric components are those components having the ability to be stretched to at least twice their original length and to retract very rapidly to approximately their original length when released. As such, block copolymers of the present invention are not merely adhesive "additives," such as pressure-sensitive-adhesive additives. That is, block copolymers of the present invention are typically not added to pre-existing adhesive formulations. In fact, adhesives of the present invention can be prepared consisting essentially of block copolymers of the present invention as the only elastomeric component. That is, preferably other elastomeric components are present in minor amounts, such as less than about 5 parts by weight, of the total adhesive composition. For certain applications, adhesives are typically prepared without using any other elastomeric components other than block copolymers of the present invention. Due to the simplicity of preparation thereof, such adhesives are preferred.

"Block copolymers" of the present invention are elastomeric components in which chemically different blocks or sequences bind each other in macromolecular chains. Block copolymers of the present invention can be divided into three main classes: triblock ((A-B-A) structure), multiblock (-(A-B)$_n$- structure), and star block copolymers ((A-B)$_n$- structure). (A-B) diblock structures are not elastomeric components in accordance with the present invention, as they typically do not possess the requisite elastomeric properties. Triblock and multiblock structures can also be classified as linear block copolymers. These linear structures are preferred.

Star block copolymers fall into a general class of block copolymer structures having a branched structure. Star block copolymers are also referred to as radial or palmtree copolymers, as they have a central point from which branches extend. Block copolymers herein are to be distinguished from comb-type polymer structures and other branched copolymers. These other branched structures do not have a central point from which branches extend.

Hot-melt processable adhesives of the present invention can advantageously be "thermally reversibly crosslinked." That is, adhesives of the present invention are able to remain hot-melt processable after application and cooling, yet retain characteristics of a crosslinked adhesive (e.g., solvent and/or creep resistance). Thus, the adhesives may be repeatedly hot-melt processed, while still providing adhesives with adequate cohesive strength after each application.

Preferred adhesive compositions in accordance with the invention are pressure-sensitive-adhesives (PSAs). PSAs are well known to those of ordinary skill in the art to possess properties including the following: (1) aggressive and permanent tack, (2) adherence with no more than finger pressure, (3) sufficient ability to hold onto an adherend, and (4) sufficient cohesive strength to be removed cleanly from the adherend.

"Heat-activatable adhesive systems" are another hot-melt processable adhesive in accordance with the present invention. Heat-activatable adhesives are substantially nontacky at room temperature, but become tacky upon heating. Heat-activatable systems, unlike PSA systems, rely on a combination of pressure and heat to bond to a surface.

Components of adhesives of the present invention are advantageously selected to provide hot-melt processable adhesives without sacrificing cohesive strength of the applied adhesive. Preferred adhesives according to the invention have cohesive strengths of at least about 2,000 minutes, more preferably at least about 6,000 minutes, and most preferably at least about 10,000 minutes when measured according to ASTM D 3654. These cohesive strengths are obtainable even in the absence of chemical crosslinking.

Furthermore, zero shear displacements are obtainable with adhesives of the present invention when tested according to the Shear Displacement test described in the Test Methods, infra. Zero shear displacement is indicative of adhesives having minimized cold flow (i.e., permanent deformation of a material that occurs as a result of prolonged compression or extension at or near room temperature). Zero shear displacement is particularly advantageous in certain applications, such as in label applications. For example, if adhesive becomes exposed from underneath an applied label, it can disadvantageously accumulate debris and contaminants.

A primary advantage of the present adhesives is that they have adequate cohesive strength after application without the need for subsequent curing steps. Although generally not necessary, additional curing steps may be utilized, however, if so desired. Such additional curing steps include exposing the adhesive to radiation, such as ultraviolet or electron beam radiation.

Block Copolymers

Block copolymers of the invention comprise at least two A blocks and at least one B block. A blocks in block copolymer structures of the present invention represent thermoplastic segments, while B blocks represent elastomeric segments. The A and B blocks are derived from monoethylenically unsaturated monomers. Thus, the A and B blocks are derived from monoethylenically unsaturated monomers, which monomers result in saturated polymer backbones without the need for subsequent hydrogenation upon their polymerization. Due to their saturation, these preferred block copolymers are expected to be less susceptible to weather-induced (e.g., ultraviolet radiation-induced and oxidation-induced) degradation.

Preferably, at least one of the A and B blocks is derived from (meth)acrylate monomers. Preferably, the B block is derived from (meth)acrylate monomers. (Meth)acrylate-derived blocks contribute to preferred properties (e.g., durability, permanence of properties over time, and versatility of adhesion) in the adhesives. In some embodiments, both of the A and B blocks are derived from (meth)acrylate monomers.

The ratio of A blocks to B blocks can vary widely. The A blocks are more rigid (i.e., they have a higher shear modulus and glass transition temperature) than the B blocks. Typically, the A blocks provide discrete reinforcing microdomains within an overwhelming continuous phase formed from less rigid B blocks. Generally, the A blocks are selected such that their solubility parameters are sufficiently different from those of the B blocks so as to cause the appropriate phase separation between the A and B blocks to cohesively reinforce the elastomer. The term "phase separation" as used herein refers to the presence of distinct reinforcing A block domains (i.e., microdomains) in a matrix comprised of the softer B block phase.

For heat-activatable adhesives, the block copolymer is tailored to have a Tg of about 25° C. to about 30° C. below the desired heat-activation temperature. Preferably the block copolymer is a PSA. As such, it is formulated to have a resultant glass transition temperature (Tg) of less than about 0° C. Monomers used to prepare the A and B blocks and adhesive additives (e.g., tackifiers and plasticizers) are selected according to the desired adhesive properties.

A Blocks

Generally, the A blocks are thermoplastic (i.e., they soften when exposed to heat and return to their original condition when cooled to room temperature). A blocks of the preferred block copolymers are derived from monoethylenically unsaturated monomers, which as homopolymers have a glass transition temperature (Tg) greater than about 20° C. Preferably, A blocks are derived from monoethylenically unsaturated monomers, which as homopolymers have a Tg of about 20° C. to about 200° C. More preferably, A blocks are derived from monoethylenically unsaturated monomers, which as homopolymers have a Tg of about 50° to about 150° C. Most preferably, A blocks are derived from monoethylenically unsaturated monomers, which as homopolymers have a Tg of 100° C. to about 150° C.

Although the A blocks can be copolymers, typically the A blocks are homopolymers independently derived from monoethylenically unsaturated monomers selected from the group consisting of (meth)acrylate esters of non-tertiary alkyl alcohols, the alkyl groups of which comprise from about 1 to about 20, preferably about 1 to about 18 carbon atoms; acrylamides; vinyl-terminated monomers; and combinations thereof. Preferably, the A blocks are independently derived from (meth)acrylate monomers, although, for certain formulations, A blocks independently derived from vinyl-terminated monomers, such as styrene, may show comparable or superior hot-melt processability.

Preferred (meth)acrylate monomers have the following general Formula (I):

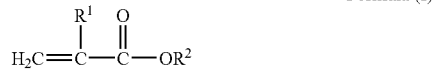

wherein $R^1$ is H or $CH_3$, the latter corresponding to where the (meth)acrylate monomer is a methacrylate monomer.

$R^2$ is a hydrocarbon group broadly selected from linear, branched, aromatic, or cyclic hydrocarbon groups. Preferably, $R^2$ is a linear, branched, or cyclic hydrocarbon group. The number of carbon atoms in the hydrocarbon group is preferably about 1 to about 20, and more preferably about 1 to about 18. When $R^2$ is a hydrocarbon group, it can also include heteroatoms (e.g., oxygen or sulfur).

Suitable (meth)acrylate monomers include, for example, benzyl methacrylate, cyclohexyl acrylate, cyclohexyl methacrylate, ethyl methacrylate, isobornyl acrylate, isobornyl methacrylate, methyl methacrylate, 1-methylcyclohexyl methacrylate, 2-methylcyclohexyl methacrylate, 3-methylcyclohexyl methacrylate, 4-methylcyclohexyl methacrylate, and 2-phenoxy ethyl methacrylate. Particularly preferred are the alkyl (meth)acrylate monomers.

(Meth)acrylate monomers that are synthetically undesirable or commercially unavailable can be provided through trans-alcoholysis (i.e., replacement of an alcohol group on the A block by a different alcohol group) or hydrolysis of the polymerized A block. When the polymerized A block is hydrolyzed, it is followed by esterification. This process may leave some residual acid in the block copolymer. While the present invention is directed toward block copolymers typically having homopolymeric blocks, block copolymers having such minor amounts of residual acid are still within the scope of the invention, although not preferred.

Suitable vinyl-terminated monomers include, for example, styrenes (e.g., styrene, alpha-methylstyrene, vinyltoluene, vinylpyridine, ethylstyrene, t-butylstyrene, isopropylstyrene, dimethylstyrene, and other alkylated styrenes) and vinyl esters (e.g., vinyl acetate). A particularly preferred vinyl-terminated monomer is styrene.

The A blocks have a weight average molecular weight below about 50,000 grams per mole, with a weight average molecular weight of about 3,000 to about 30,000 grams per mole being preferred, and a weight average molecular weight of about 5,000 to about 15,000 grams per mole being most preferred. These relatively low molecular weights facilitate hot-melt processing of adhesives comprising the block copolymers.

B Blocks

Generally the B blocks are elastomers. The B block is derived from monoethylenically unsaturated monomers. Preferably the B block is derived from monoethylenically unsaturated monomers, which as homopolymers have a glass transition temperature (Tg) of less than about 20° C., particularly when the desired adhesive composition is a PSA. Preferably, B blocks are derived from monoethylenically unsaturated monomers, which as homopolymers have a Tg of about −70° C. to about 20° C. More preferably, B blocks are derived from monomers, which as homopolymers have a Tg of −60° C. to about 0° C. Most preferably, B blocks are derived from monoethylenically unsaturated monomers, which as homopolymers have a Tg of −60° C. to about −10° C.

When heat-activatable adhesives are desired, monomer selection is modified accordingly, as well known to those of ordinary skill in the art. For example, monomers used to prepare the B blocks can be selected such that they have a bulk modulus greater than the Dahlquist criterion when a heat-activatable adhesive is desired. Alternatively, Tg of the B block can be controlled to provide a resultant block copolymer having a Tg of about 25° C. to about 30° C. below the desired heat-activation temperature. Another way of obtaining heat-activatable adhesives is by adding a large proportion of tackifiers to the adhesive composition.

Although the B blocks can be copolymers, typically the B blocks are homopolymers derived from monoethylenically unsaturated monomers selected from the group consisting of (meth)acrylate esters of non-tertiary alkyl alcohols, the alkyl groups of which comprise from about 1 to about 20, preferably about 1 to about 18 carbon atoms; acrylamides; and vinyl-terminated monomers (e.g., vinyl esters). Preferably, the B blocks are derived from (meth)acrylate monomers.

Preferred (meth)acrylate monomers have the following general Formula (I):

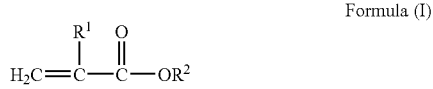

Formula (I)

wherein $R^1$ is H or $CH_3$, the latter corresponding to where the (meth)acrylate monomer is a methacrylate monomer. Preferably, $R^1$ is H, as acrylates are generally less rigid than their methacrylate counterparts.

$R^2$ is a hydrocarbon group broadly selected from linear, branched, aromatic, or cyclic hydrocarbon groups. Preferably, $R^2$ is a linear or branched hydrocarbon group. The number of carbon atoms in the hydrocarbon group is preferably about 1 to about 20, and more preferably about 1 to about 18. When $R^2$ is a hydrocarbon group, it can also include heteroatoms (e.g., oxygen or sulfur). Preferably $R^2$ has at least two more or at least two fewer carbon atoms than $R^2$ of the A block.

Suitable (meth)acrylate monomers include, for example, n-butyl acrylate, decyl acrylate, 2-ethoxy ethyl acrylate, 2-ethoxy ethyl methacrylate, isoamyl acrylate, n-hexyl acrylate, n-hexyl methacrylate, isobutyl acrylate, isodecyl acrylate, isodecyl methacrylate, isononyl acrylate, 2-ethylhexyl acrylate, 2-ethylhexyl methacrylate, isooctyl acrylate, isooctyl methacrylate, isotridecyl acrylate, lauryl acrylate, lauryl methacrylate, 2-methoxy ethyl acrylate, 2-methyl butyl acrylate, 4-methyl-2-pentyl acrylate, n-octyl acrylate, and n-octyl methacrylate.

(Meth)acrylate monomers that are synthetically undesirable or commercially unavailable can be provided through trans-alcoholysis (i.e., replacement of an alcohol group on the B block by a different alcohol group) or hydrolysis of the polymerized B block. When the polymerized B block is hydrolyzed, it is followed by esterification. This process may leave some residual acid in the block copolymer. While the present invention is directed toward block copolymers typically having homopolymeric blocks, block copolymers having such minor amounts of residual acid are still within the scope of the invention, although not preferred.

The molecular weight of the B block is such that a continuous phase is formed in the block copolymer. Preferably, the B blocks have a weight average molecular weight of about 30,000 to about 500,000 grams per mole and, more preferably, a weight average molecular weight of about 70,000 to about 200,000 grams per mole.

Polymerization

Any technique that produces well-controlled block copolymer structures is suitable for preparing block copolymers of the present invention. These techniques can include living free radical polymerization techniques, living anionic polymerization, and group transfer polymerization. Specific examples of living free radical polymerization include: atom transfer polymerization and reversible addition-fragmentation chain transfer polymerization.

Living polymerization typically leads to more stereoregular block structures than those blocks polymerized using non-living or pseudo-living polymerization (e.g., those using iniferters). Stereoregularity (as evidenced by highly syndiotactic and/or isotactic structures) contributes to block copolymers having well-controlled block structures and influences the glass transition temperature of the block. For example, syndiotactic polymethyl methacrylate (PMMA) synthesized using living polymerization has a glass transition temperature that is about 20–25° C. higher than a comparable PMMA synthesized using conventional (i.e., non-living) polymerization. Stereoregularity is detectable, for example, using nuclear magnetic resonance spectroscopy, differential scanning calorimetry, or similar analytical techniques. Structures with greater than about 75% stereoregularity are obtainable when using living polymerization.

Living anionic polymerization is generally preferred. However, when polymerizing at higher temperatures (e.g., greater than about −40° C.), living free radical polymerization may be preferred, as living free radical polymerization is typically less sensitive to temperature variations than is living anionic polymerization.

By "well-controlled" block copolymer structures is meant that the polymerization method leads to block copolymers having at least one of the following preferred properties, preferably more than one of the following properties, and preferably all of the following properties. These properties are as follows: controlled molecular weight, low polydispersity, well-defined blocks, and blocks having high purity.

Preferably, molecular weight of the block copolymers is controlled. That is, theoretical molecular weight ranges of the A and B blocks are obtainable after polymerization. Preferably the resulting molecular weight is about 0.1 to about 10.0 times the predicted molecular weight, more preferably about 0.8 to about 1.2 times the predicted molecular weight, and most preferably about 0.9 to about 1.1 times the predicted molecular weight. As such, desired block copolymer structures can be designed (i.e., theoretically) and then easily replicated by the selected polymerization method.

Preferably, polydispersity (as measured, for example, by gel permeation chromatography) of each block and the overall block copolymer is about 2.0 or less. More preferably, polydispersity of each block and the overall block copolymer is about 1.7 or less, even more preferably about 1.5 or less, even more preferably about 1.3 or less, and even more preferably about 1.2 or less. Most preferably, polydispersity of each block and the overall block copolymer is as close to 1.0 as possible.

Preferably, boundaries between microdomains comprising the A blocks and the continuous phase comprising the B blocks are well-defined (i.e., the boundaries are essentially free of tapered structures—those structures derived from monomers used for both the A and B blocks). Tapered structures can increase the glass transition temperature of the B block, which can hinder formulation latitude of the adhesive composition. Furthermore, tapered structures can increase mixing of phases comprising the A and B blocks, which decreases overall cohesive strength of the adhesive composition.

Preferably, the A and B blocks have high purity. For example, A blocks are essentially free of segments derived from monomers used to prepare the B blocks (e.g., random copolymer segments or tapered segments are not detectable using nuclear magnetic resonance spectroscopy). Similarly, B blocks are essentially free of segments derived from monomers used to prepare the A blocks (e.g., random copolymer segments or tapered segments are not detectable using nuclear magnetic resonance spectroscopy).

Preferably, the polymerization technique does not use iniferters. The use of iniferters generally prevents obtainment of the well-controlled block copolymer structures of the present invention. Furthermore, residue from iniferters can be problematic. For example, thiocarbamates (i.e., a commonly used iniferter) present in the resulting block copolymer can make the block copolymer more susceptible to weather-induced degradation. It is believed that this weather-induced degradation may be a result of the relatively weak carbon-sulfur link in the thiocarbamate residue. Presence of thiocarbamates can be detected, for example, using elemental analysis or mass spectroscopy.

When using living polymerization to form a block copolymer, typically the first step of the process involves contacting monomers of the A block with an initiator in the presence of an inert diluent to form a living polymer. The inert diluent used in the polymerization process facilitates heat transfer and adequate mixing of the initiator and monomer. Any suitable inert diluent may be used. Typically the inert diluent is a saturated hydrocarbon, aromatic hydrocarbon, or ether. Examples of such diluents include: saturated aliphatic and cycloaliphatic hydrocarbons, such as hexane, heptane, octane, cyclohexane, and the like; and aromatic hydrocarbons, such as toluene. In addition, aliphatic and cyclic ether solvents may be used. Examples of such diluents include: dimethyl ether, diethyl ether, and tetrahydrofuran.

When using living anionic polymerization, the living polymer can then be represented by a simplified structure, A-M, where M represents a Group I metal such as Li, Na and K and A represents the A block. For example, when a charge of different monomer (B) is then added, followed by another charge of monomer A, an (A-B-A) triblock copolymer results. The molecular weight of the polymer blocks formed is determined by the amounts of initiator and monomer used. Alternatively, living A-B-M (i.e., a living diblock) can be coupled using difunctional or multifunctional coupling agents to form (A-B-A) triblock or $(A-B)_n$- star block copolymers, respectively.

Any suitable initiator or combination thereof can be used. Typical initiators include alkali metal hydrocarbons. For example, monofunctional initiators are useful initiators in the first step of the process described above, such as organomonolithium. These compounds are represented by the structure R—Li where "R" is an aliphatic, cycloaliphatic or aromatic radical and "Li" is lithium. Examples include ethyl lithium, n-propyl lithium, iso-propyl lithium, n-butyl lithium, sec-butyl lithium, tert-octyl lithium, n-decyllithium, phenyl lithium, 2-naphthyl lithium, 4-butylphenyl lithium, 4-phenylbutyl lithium, cyclohexyl lithium, and the like.

Difunctional initiators may also be used. Difunctional initiators include, for example, 1,1,4,4-tetraphenyl-1,4-dilithiobutane; 1,1,4,4-tetraphenyl-1,4-dilithioisobutane; naphthalenelithium; naphthalenesodium; naphthalenepotassium; homologues thereof; dilithium initiators (e.g., those prepared by addition reaction of alkyl lithium with a divinyl compound, for example, 1,3-bis(1-phenylethenyl)benzene; m-diisopropenylbenzene); and the like.

Co-initiators may also be used. Co-initiators include, for example, lithium halides (e.g., lithium chloride); alkali metal alkoxides; oligomeric (or polymeric) ethers or amides, alkali metal derivatives thereof; and alkyl aluminum compounds.

When living free radical polymerization is used, any suitable initiator or combination thereof can be used. For a description of living free radical polymerization and suitable initiators therefor, see PCT Publication No. WO 97/18,247 (Carnegie Mellon) and PCT Publication No. WO 98/01,478 (E.I. duPont de Nemours and Co.).

The amount of initiator used during living polymerization usually dictates the molecular weight of the living polymer. If a small portion of initiator is used with respect to the amount of monomer, the molecular weight of the living polymer will generally be larger than if a large portion of initiator is used.

For living anionic polymerization, it is generally advisable to add the initiator dropwise to the monomer until the persistence of the characteristic color of the organic anion in the initiator is observed. Then, the calculated amount of the initiator is added for the molecular weight desired. The preliminary dropwise addition serves to destroy contaminants and, thus, permits better control of the polymerization.

The polymerization temperature will depend upon the monomers being polymerized and the type of polymerization method being used. Generally, the reaction can be carried out at a temperature ranging from about −100° C. to about 100° C. Usually the polymerization temperature is about −80° C. to about 20° C. when using living anionic polymerization and about 20° C. to about 100° C. for when using living free radical polymerization.

In general, the polymerization should be carried out under controlled conditions so as to exclude substances that destroy the initiator or living anion. Typically, the polymerization is carried out in an inert atmosphere, such as nitrogen, helium, or argon. When living anionic polymerization is used, anhydrous conditions may be necessary.

Additives

Other additives may be blended into the hot-melt processable adhesive prior to application thereof, the type and amount depending on the desired properties of the applied adhesive.

Any suitable additive may be blended into the hot-melt processable adhesive. For example, to improve hot-melt processability, A block-compatible resins may also be used in the adhesive compositions. Those of ordinary skill in the block copolymer art will recognize many suitable additives. However, solubility parameter differences between blocks in rubber-based (e.g., polystyrene-polydiene type) block copolymers are usually different than in copolymers of the present invention containing blocks derived from monoethylenically unsaturated monomers, such as (meth)acrylate monomers (i.e, the difference in solubility parameters between the A and B blocks is typically smaller than in rubber-based block copolymers). Thus, selective tackification or plasticization of each block requires different considerations than when rubber-based block copolymers are used. Thus, additive selection in the present case is quite different than when rubber-based block copolymers are used.

Preferably, any additive used, however, is compatible with the B block of the block copolymer of the invention. An additive is compatible in a phase (e.g., A block or B block) if it causes a shift in the glass transition temperature (Tg) of that phase (assuming that the tackifier and the phase do not have the same Tg).

Other polymers may be blended into the adhesive composition. However, this is generally not necessary. For example, minor amounts of block copolymers having an (A-B) diblock structure may be present in the hot-melt processable adhesive in addition to the block copolymer of the present invention. It may be desirable, however, to add further block copolymer having an (A-B) diblock structure. The further addition of these diblock copolymers may facilitate hot-melt processability of the adhesive, as well as increase the level of tack. Typically, if a block copolymer having an (A-B) diblock structure is used, the amount is up to about 80 parts by weight based on 100 parts by weight of the block copolymer of the present invention. Preferably at least the A block of such diblock copolymers is the same chemical composition as the A block of the block copolymer of the present invention, most preferably both the A and B blocks are the same chemical composition as the A and B blocks of the block copolymer of the present invention.

Also, the block copolymer itself may not be sufficiently tacky for the desired application. Thus, it may be necessary to add a tackifying resin (i.e., tackifier or combination of resins to increase the tack of the adhesive. In fact, it is preferable to use relatively large proportions of tackifying resins in adhesives of the present invention. In general, tackifying resins are less expensive than block copolymers of the present invention. Furthermore, large proportions of tackifying resins may also be desirable when formulating to provide heat-activatable adhesives. Tackifying resins can also facilitate hot-melt processability.

Typically, at least one tackifying resin is compatible with the B block, but it may also be partially compatible with the A block. Preferably, the tackifying resin is compatible with the B block and incompatible with the A block. Typically the Tg of the B block is shifted to a higher temperature in the present invention when a tackifier is used.

Solid or liquid tackifiers can be used. Solid tackifiers generally have a number average molecular weight (Mn) of 10,000 grams per mole or less and a softening point above about 70° C. Liquid tackifiers are viscous materials that have a softening point of about 0° C. to about 70° C. Solid tackifying resins are generally preferred.

Suitable tackifying resins include rosins and their derivatives (e.g., rosin esters); polyterpenes and aromatic-modified polyterpene resins; coumarone-indene resins; and hydrocarbon resins, for example, alpha pinene-based resins, beta pinene-based resins, limonene-based resins, aliphatic hydrocarbon-based resins, aromatic-modified hydrocarbon-based resins, aromatic hydrocarbon resins, and dicyclopentadiene-based resins. Non-hydrogenated tackifying resins are typically more colorful and less durable (i.e., weatherable) than block copolymers of the present invention. Thus, when appropriate, hydrogenated (either partially or completely) tackifying resins may also be used. Examples of hydrogenated tackifying resins include, for example: hydrogenated rosin esters, hydrogenated acids, hydrogenated aromatic hydrocarbon resins, hydrogenated aromatic-modified hydrocarbon-based resins, and hydrogenated aliphatic hydrocarbon-based resins. Particularly preferred hydrogenated tackifying resins are hydrogenated rosin esters, hydrogenated acids, hydrogenated aromatic hydrocarbon resins, and hydrogenated aromatic-modified hydrocarbon-based resins.

Any suitable amount of tackifying resin may be used. Preferably the tackifying resin is present in the adhesive in an amount of greater than about 40 parts by weight based on 100 parts by weight of the block copolymer. For example, the tackifying resin may be present in an amount of about 40 parts by weight to about 400 parts by weight based on 100 parts by weight of the block copolymer. More preferably, the tackifying resin is present in the adhesive in an amount of about 40 parts by weight to about 200 parts by weight, even more preferably about 60 parts by weight to about 140 parts by weight, and most preferably about 80 parts by weight to about 120 parts by weight, based on 100 parts by weight of the block copolymer. Higher amounts may be desired, however, particularly when formulating heat-activatable adhesives.

Plasticizers may also be used in adhesives of the invention. Plasticizers are well known in the art and may include, for example, hydrocarbon oils (e.g., those that are aromatic, paraffinic, or naphthenic), hydrocarbon resins, polyterpenes, rosin esters, phthalates, phosphate esters, dibasic acid esters, fatty acid esters, polyethers, and combinations thereof. Plasticizers are optional and may be present in adhesives of the invention in any suitable amount, such as for example, amounts up to about 100 parts by weight, preferably up to about 50 parts by weight, based on 100 parts by weight of the block copolymer.

Photocrosslinkers can also be added for optional subsequent curing by UV-irradiation. Although not present in the preferred embodiments, conventional crosslinking agents (both physical and chemical crosslinking agents) can also be utilized in all embodiments of the present invention. Crosslinkers are optional and may be present in adhesives of the invention in any suitable amount, such as for example, amounts up to about 5 parts by weight based on 100 parts by weight of the total composition.

Other optional additives include, for example, stabilizers (e.g., antioxidants or UV-stabilizers), pigments, fillers, medicaments, and the like. The use of such additives is well known to those of ordinary skill in the art.

Application of the Hot-Melt Processable Adhesives

The hot-melt processable adhesive can be readily applied to a substrate. For example, the hot-melt processable adhesive can be applied to sheeting products (e.g., decorative, reflective, and graphical); borders of, for example, medical electrodes and drug delivery patches; labelstock; and tape backings. The substrate can be any suitable type of material depending on the desired application. Typically, the substrate comprises a nonwoven, woven, foam, paper, polypropylene (e.g., biaxially oriented polypropylene (BOPP)), polyethylene, polyester (e.g., polyethylene terephthalate), or release liner (e.g., siliconized liner).

Thus, hot-melt processable adhesives according to the present invention can be utilized to form tape, for example. To form a tape, the hot-melt processable adhesive is coated onto at least a portion of a suitable backing. A release material (e.g., low adhesion backsize) can be applied to the opposite side of the backing, if desired. When double-sided tapes are formed, the hot-melt processable adhesive is coated onto at least a portion of both sides of the backing.

Hot-melt processable adhesives can be applied to a substrate using methods well known to one of ordinary skill in the art. For example, the block copolymer and other components can be blended and applied using for example, one of spraying, melt-extruding, blowing (e.g., into blown microfibers), and foaming techniques to form adhesive-coated substrates of the present invention.

The adhesive can be formed into a film or coating by either continuous or batch processes. An example of a batch process is the placement of a portion of adhesive between a substrate to which the film or coating is to be adhered and a surface capable of releasing the adhesive film or coating to form a composite structure. The composite structure can then be compressed at a sufficient temperature and pressure to form an adhesive coating or layer of a desired thickness after cooling. Alternatively, the adhesive can be compressed between two release surfaces and cooled to form an adhesive transfer tape useful in laminating applications.

Continuous forming methods include drawing the hot-melt processable adhesive out of a film die and subsequently contacting the drawn adhesive to a moving plastic web or other suitable substrate. A related continuous method involves extruding the adhesive and a coextruded backing material from a film die and cooling the layered product to form an adhesive tape. Other continuous forming methods involve directly contacting the adhesive to a rapidly moving plastic web or other suitable preformed substrate. Using this method, the adhesive is applied to the moving preformed web using a die having flexible die lips, such as a rotary rod die. After forming by any of these continuous methods, the adhesive films or layers can be solidified by quenching using both direct methods (e.g., chill rolls or water baths) and indirect methods (e.g., air or gas impingement).

Although coating without using solvent is preferred, adhesives of the invention can be coated using a solvent-based method. For example, the adhesives can be coated by such methods as knife coating, roll coating, gravure coating, rod coating, curtain coating, and air knife coating. Any suitable solvent can be used. Examples of suitable solvents include ethyl acetate, acetone, methyl ethyl ketone, and combinations thereof. After coating, the adhesive is dried to remove the solvent. Preferably, the coated adhesive is subjected to increased temperatures, such as those supplied by an oven, to expedite drying of the adhesive.

The block copolymers, hot-melt processable adhesives therefrom and processes herein are exemplified in the following examples. These examples are merely for illustrative purposes only and are not meant to be limiting on the scope of the appended claims. All parts, percentages, ratios, etc. in the examples and the rest of the specification are by weight unless indicated otherwise.

EXAMPLES

| Abbreviation of Compounds | |
| --- | --- |
| Abbreviation | Full Name |
| DPE | 1,1-diphenylethylene, commercially available from Aldrich Chemical, Milwaukee, WI, and vacuum distilled from sec-butyl lithium and diluted by toluene to a concentration of about 0.3 moles/liter |
| EA | ethyl acrylate |
| EGDMA | ethyleneglycol dimethacrylate, commercially available from Aldrich Chemical, Milwaukee, WI |
| FORAL 105 | a rosin ester, commercially available from Hercules, Inc., Wilmington, DE under the trade designation FORAL 105 |
| iOA | isooctyl acrylate |

-continued

| Abbreviation of Compounds | |
| --- | --- |
| Abbreviation | Full Name |
| LiCl | 99.99% pure, commercially available from Aldrich Chemical, Milwaukee, WI, and dried under vacuum at 130° C. |
| MMA | methyl methacrylate, commercially available from Aldrich Chemical, Milwaukee, WI, purified by refluxing over calcium hydride, vacuum distilling, and storing under a nitrogen atmosphere at −20° C. |
| nBA | n-butyl acrylate, commercially available from Aldrich Chemical, Milwaukee, WI |
| PA | propyl acrylate |
| PE | Polyethylene |
| PET | polyethylene terephthalate |
| PLASTHALL DIODD | an aliphatic plasticizer, commercially available from CP Hall Company, Chicago, IL under the trade designation PLASTHALL DIODD |
| PTSA | para-toluene sulfonic acid, commercially available from Aldrich Chemical, Milwaukee, WI |
| REGALREZ 1018 | a hydrogenated hydrocarbon resin, commercially available from Hercules, Inc., Wilmington, DE under the trade designation REGALREZ 1018 |
| REGALREZ 3102 | a partially hydrogenated synthetic hydrocarbon resin, commercially available from Hercules, Inc., Wilmington, DE under the trade designation REGALREZ 3102 |
| S | Styrene (commercially available from Aldrich Chemical, Milwaukee, WI, purified by refluxing over calcium hydride, vacuum distilling, and storing under a nitrogen atmosphere at −20° C.) |
| SCHENECTADY SP-553 | a terpene phenolic resin available from Schenectady International, Schenectady, NY under the trade designation SCHENECTADY SP-553 |
| SUPERESTER A-100 | a rosin ester available from Arakawa Chemical USA, Chicago, IL under the trade designation SUPERESTER A-100 |
| tBA | tert-butyl acrylate, commercially available from Aldrich Chemical, Milwaukee, WI and purified by refluxing over calcium hydride, adding an equivalent volume of toluene to the tBA, vacuum distilling, and storing under a nitrogen atmosphere at −20° C. |
| THF | tetrahydrofuran, commercially available from Janssen, Belgium, and dried by distillation from sodium-benzophenone ketyl |
| XDC | xylylene-bis (N,N-diethyl dithiocarbamate), prepared as described by Otsu et al. in Polymer Bulletin 1984, 11, 135–142 |

Definition of Terms

Block copolymers in the following examples are typically described in short-hand for convenience.

For example, poly(methyl methacrylate-b-iso-octyl acrylate-b-methyl methacrylate) is also described as MMA-iOA-MMA and refers to a block copolymer having blocks (as denoted by "b") of poly-methyl methacrylate (MMA) and poly-iso-octyl acrylate (iOA). In this polymer, the MMA blocks are referred to as the endblocks, or the A blocks, and the iOA block is referred to as the midblock, or the B block (using the ABA nomenclature).

Molecular weights of the block copolymers are also typically described in short-hand. For example, 10-100-10 describes a block copolymer where the endblocks have a weight average molecular weight of 10,000 grams per mole and the midblock has a weight average molecular weight of 100,000 grams per mole.

Star block copolymers are described similarly, using the nomenclature (AB)n, where A and B are as described above and n denotes the average number of arms in the star. For example a polymer (S-iOA)n has an average of "n" polystyrene-b-poly(iso-octyl acrylate) arms. With respect to molecular weight, $(10-100)_{3.3}$ means that the styrene endblocks have a weight average molecular weight of 10,000 grams per mole, the iOA midblocks have a weight average molecular weight of 100,000 grams per mole, and the average number of arms per star is 3.3.

Polydispersity, also known as the molecular weight distribution, is the ratio of $M_w/M_n$ ($M_w$=weight average molecular weight, $M_n$=number average molecular weight) and is often used to describe polymers, especially polymers prepared by living polymerization techniques. Polydispersity is measured by GPC (gel permeation chromatography), also known as SEC (size exclusion chromatography). The polydispersity values in the examples, when measured, were measured using tetrahydrofuran (THF) solutions with a HEWLETT-PACKARD 1090 apparatus (commercially available from Hewlett-Packard Company Palo Alto, Calif.) equipped with linear styragel-type columns or for the comparative examples, a POLYMER LABS apparatus (commercially available from Polymer Laboratories, Amherst, Mass.) equipped with a PL-GEL MIXED-B column (commercially available from Polymer Laboratories, Amherst, Mass.) and a refractive index detector. Polymethyl methacrylate (PMMA) or, for the comparative examples, polystyrene (PS) standards were used for calibration.

Test Methods

180° Peel Strength

Tapes were analyzed using a SINTECH 6 computerized system (commercially available from Sintech, a division of MTS Systems Corporation; Eden Prairie, Minn.) for materials testing according to the standard tape method AFERA (Association de Fabricants Européens de Rubans Auto-Adhésifs) 4001. Peel adhesion is the force required to remove an adhesive-coated, flexible sheet material from a test panel. Peel adhesion is measured at a specific angle and rate of removal. In the following examples, this peel adhesion force is expressed in Newtons/decimeter width (N/dm) of the coated sheet. Peel adhesion forces measured throughout are initial peel adhesion forces taken at about ten minutes dwell time, unless indicated to the contrary.

A strip (1.27 centimeter wide) of the adhesive-coated sheet was applied to the horizontal surface of a clean glass test plate with at least 12.7 lineal centimeter of both surfaces being in firm contact. One pass with a 2-kilogram hard rubber roller was used to apply the strip. The free end of the coated strip was doubled back nearly touching itself so the angle of removal was 180°. The free end was attached to the adhesion tester scale. The glass test plate was clamped in the jaws of a tensile testing machine that was capable of moving the plate away from the scale at a constant rate of 30.5 centimeters/minute (12 inches/minute) from glass or polyethylene substrates, as noted in the Examples. The data was reported as the average of the range of numbers observed during the test.

If 2-bond failure is reported for an Example, the backing pulled away from the adhesive instead of the adhesive pulling away from the substrate. In other words, the tape did not exhibit good integrity.

Shear Strength

Shear strength is a measure of the cohesive strength of an adhesive. Shear strength is based upon the amount of force required to pull an adhesive strip (tape) from a standard flat surface in a direction parallel to the surface to which it has been affixed with a definite pressure. Shear strength was measured as the time, in minutes, required to pull a standard area of adhesive-coated sheet material from a stainless steel test panel under the stress of a constant, standard load. This test followed the procedure described in ASTM D 3654: "Holding Power of Pressure-Sensitive Adhesive Tapes."

The tests were conducted at room temperature (about 22° C. to about 25° C.) on strips of adhesive-coated sheet material applied to a stainless steel panel. A 0.127 decimeter square portion of each strip was in firm contact with the panel and one end portion of the tape was free. The panel, with the adhesive-coated strip attached, was held in a rack such that the panel formed an angle of 178° with the extended free end of the adhesive-coated strip. The free end was tensioned by applying a force of 1,000 grams to the free end of the adhesive-coated strip. An angle of 2° less than 180° was used in order to negate any peel forces. Thus, only shear forces were measured.

The time elapsed for each tape example to separate from the test panel was recorded as the shear strength (>10,000 minutes or >5,000 minutes indicates that the sample had not failed after that number of minutes and the test was stopped at that point in time). The failure mode of the PSA in each example was cohesive (visible adhesive residue is left on the test panel), unless otherwise noted.

Shear Displacement

A strip of adhesive tape (20 millimeters wide and 100 millimeters long) was attached to a stainless steel plate (as used in the shear strength test method) and a 2-kilogram rubber roller was passed over the strip. The adhered strip was conditioned for twenty minutes at a constant temperature (about 22° C.) and humidity (about 50% relative humidity) followed by conditioning for twenty minutes in an oven maintained at 60° C. A 1-kilogram weight was attached to the bottom of the strip and the panel was placed at in incline (2° from vertical) in a 60° C. oven. The shear displacement reported is the measured misalignment (i.e., vertical displacement) after one hour elapsed time.

Tensile Testing

Tensile properties were measured using an INSTRON tensile tester (Model 1122, commercially available from Instron Corporation; Canton, Mass.) and ASTM D412-98a). Films were prepared from the block copolymer solutions and dried for several days at room temperature, followed by drying to completion under vacuum. Microdumbells were then cut from the solution-cast films, each microdumbell having a thickness of about 1.5–2.0 millimeters and a width of about 4.0 millimeters.

The samples were stretched at a rate of 100 millimeters per minute at room temperature. Strain was measured from the crosshead displacement. The tensile strength at break (in MegaPascals) and % Elongation were reported.

Examples 1–6

Synthesis of (Meth)acrylate Block Copolymers Using Anionic Polymerization

Example 1

Synthesis of MMA-iOA-MMA Copolymers

Step I: Preparation of MMA-tBA-MMA Copolymers

The same general procedure was used to generate a series of MMA-tBA-MMA block copolymers. The reagents used to prepare the each specific copolymer are listed in Table 1.

To a glass flask that was flame-dried and purged with nitrogen was added a desired amount of LiCl. THF and DPE were added to the flask using rubber septa and stainless steel capillaries (THF) or syringes (DPE). A 3-fold molar excess of DPE and a 5-fold molar excess of LiCl (based on the amount of sec-butyl lithium initiator, infra) was used.

An initiator solution of sec-butyl lithium in cyclohexane having a molarity of 0.25 moles/liter (the initiator solution was further diluted from a commercially available from Aldrich Chemical, Milwaukee, Wis. having a molarity of 1.3 moles/liter) was added dropwise to the reaction flask until a red color persisted (the color of the organic anion, indicating that any remaining moisture in the solution was consumed), followed by the addition of the desired stoichiometric quantity of initiator solution (as noted in Table 1).

The reaction mixture was cooled to −78° C. and the desired quantity of MMA was added, as noted in Table 1. Polymerization was allowed to proceed for 1 hour at −78° C. The sequential addition and polymerization of tBA and MMA, in the amounts indicated in Table 1, was carried out under the same conditions.

The resulting copolymer was quenched with degassed methanol (commercially available from Aldrich Chemical, Milwaukee, Wis.) and precipitated by addition to a 90/10 (by volume) mixture of methanol/water while stirring. The copolymer was then dried overnight under vacuum at 60–80° C. Amounts given in the following tables are in parts by weight (pbw).

TABLE 1

| MMA-tBA-MMA Polymer No. | LiCl (pbw) | THF (pbw) | DPE (pbw) | sec-BuLi (pbw) | 1st Addition of MMA (pbw) | tBA (pbw) | 2nd Addition of MMA (pbw) |
|---|---|---|---|---|---|---|---|
| A | 0.060 | 443 | 0.18 | 0.011 | 3.50 | 17.50 | 3.50 |
| B | 0.106 | 1,152 | 0.27 | 0.032 | 7.50 | 50.00 | 7.50 |
| C | 0.106 | 1,063 | 0.27 | 0.032 | 5.00 | 50.00 | 5.00 |
| D | 0.154 | 443 | 0.39 | 0.045 | 2.49 | 17.75 | 2.49 |
| E | 0.053 | 532 | 0.23 | 0.016 | 0.88 | 25.00 | 0.88 |
| F | 0.077 | 443 | 0.19 | 0.023 | 2.52 | 18.00 | 2.52 |
| G | 0.053 | 532 | 0.23 | 0.016 | 1.75 | 17.50 | 1.75 |
| H | 0.108 | 1,063 | 0.27 | 0.032 | 2.50 | 50.00 | 2.50 |

Step II: Preparation of MMA-iOA-MMA Copolymer from MMA-tBA-MMA Copolymers

The same general procedure was used for the transalcoholysis of each of the eight copolymers prepared in Step I. In a glass flask, 10.0 pbw MMA-tBA-MMA was dissolved in 164 pbw iso-octyl alcohol (commercially available from Exxon, Houston, Tex.) and 0.50 pbw PTSA. The mixture was refluxed at 150° C. for 48 hours. Then, the copolymer was precipitated in methanol and dried overnight under vacuum at 80° C. The resulting MMA-iOA-MMA copolymers and the molecular weights and polydispersity values thereof are described in Table 2.

TABLE 2

| MMA-iOA-MMA Polymer No. | Molecular Weight | Polydispersity Value |
|---|---|---|
| 1A | 20-143-20 | 1.06 |
| 1B | 15-143-15 | 1.05 |
| 1C | 15-143-15 | 1.06 |
| 1D | 3.5-35-3.5 | 1.09 |
| 1E | 3.5-100-3.5 | 1.07 |
| 1F | 7-70-7 | 1.08 |
| 1G | 7-100-7 | 1.08 |
| 1H | 5-140-5 | 1.10 |

Example 2

Synthesis of MMA-nBA-MMA Copolymer

Step I: Preparation of MMA-tBA-MMA Copolymer
  Same as in Example 1 to prepare Polymer C.

Step II: Preparation of MMA-nBA-MMA Copolymer from MMA-tBA-MMA Copolymer

In a glass flask, 10.0 pbw MMA-tBA-MMA was dissolved in 184 pbw n-butyl alcohol (commercially available from Aldrich Chemical, Milwaukee, Wis.) and 0.50 pbw PTSA. The mixture was refluxed at 150° C. for 48 hours. Then, the copolymer was precipitated in methanol and dried overnight under vacuum at 80° C.

Example 3

Synthesis of MMA-PA-MMA Copolymer

Step I: Preparation of MMA-tBA-MMA Copolymer
  Same as in Example 1 to prepare Polymer A.

Step II: Preparation of MMA-PA-MMA Copolymer from MMA-tBA-MMA Copolymer

In a glass flask, 10.0 pbw MMA-tBA-MMA was dissolved in 161 pbw n-propyl alcohol (commercially available from Aldrich Chemical, Milwaukee, Wis.) and 0.50 pbw PTSA. The mixture was refluxed at 150° C. for 48 hours. Then, the copolymer was precipitated in methanol and dried overnight under vacuum at 80° C.

Example 4

Synthesis of MMA-EA-MMA Copolymer

Step I: Preparation of MMA-tBA-MMA Copolymer
  Same as in Example 1 to prepare Polymer A.

Step II: Preparation of MMA-EA-MMA Copolymer from MMA-tBA-MMA Copolymer

In a glass flask, 10.0 pbw MMA-tBA-MMA was dissolved in 157 pbw ethyl alcohol (commercially available from Aldrich Chemical, Milwaukee, Wis.) and 0.50 pbw PTSA. The mixture was refluxed at 150° C. for 48 hours. Then, the copolymer was precipitated in methanol and dried overnight under vacuum at 80° C.

Example 5

Synthesis of (MMA-iOA)$_n$ Star Block Copolymer

Step I: Preparation of (MMA-tBA)$_n$ Star Block Copolymer

To a glass flask that was flame dried and purged with nitrogen was added 0.149 pbw LiCl. Then, 975 pbw THF and 0.38 pbw DPE were added to the flask using rubber septa and stainless steel capillaries (THF) or syringes (DPE). A 3-fold molar excess of DPE and a 5-fold molar excess of LiCl (based on the amount of sec-butyl lithium initiator) was used.

An initiator solution of sec-butyl lithium in cyclohexane having a molarity of 0.25 moles/liter (the initiator solution was further diluted from a commercially available from Aldrich Chemical, Milwaukee, Wis. having a molarity of 1.3 moles/liter) was added dropwise to the reaction flask until a red color persisted (the color of the organic anion, indicating that any remaining moisture in the solution was consumed), followed by the addition 0.045 pbw initiator solution.

The reaction mixture was cooled to −78° C. and 7.00 pbw MMA was added. Polymerization was allowed to proceed for 1 hour at −78° C. The sequential addition and polymerization of 70.00 pbw tBA and 1.4 pbw EGDMA (for a molar ratio of EGDMA to Li of 10:1) was carried out under the same conditions to link the living diblocks into a star structure.

The resulting copolymer was quenched with degassed methanol (commercially available from Aldrich Chemical, Milwaukee, Wis.) and precipitated by addition to a 90/10 (by volume) mixture of methanol/water while stirring. The copolymer was then dried overnight under vacuum at 60–80° C.

Step II: Preparation of MMA-iOA)$_n$ Star Block Copolymer from the (MMA-tBA)n Star Block Copolymer In a glass flask, 10.0 pbw (MMA-tBA)n was dissolved in 164 pbw iso-octyl alcohol (commercially available from Exxon, Houston, Tex.) and 0.50 pbw PTSA. The mixture was refluxed at 150° C. for 48 hours. Then, the copolymer was precipitated in methanol and dried overnight under vacuum at 80° C. The resulting (MMA-iOA)n copolymer had a molecular weight of $(10–100)_{3.8}$ and a polydispersity value of 1.13.

Example 6

Synthesis of (S-iOA)n Star Block Copolymer

Step I: Preparation of (S-tBA)n Star Block Copolymer Copolymers

The same general procedure was used to generate a series of (S-tBA)n star block copolymers. The reagents used to prepare the each specific copolymer are listed in Table 3.

To a glass flask that was flame-dried and purged with nitrogen was added 0.064 pbw LiCl. Then, 443 pbw THF and 0.16 pbw DPE were added to the flask using rubber septa and stainless steel capillaries (THF) or syringes (DPE). A 3-fold molar excess of DPE and a 5-fold molar excess of LiCl (based on the amount of sec-butyl lithium initiator, infra) was used.

Then, 0.019 pbw of an initiator solution of sec-butyl lithium in cyclohexane having a molarity of 0.25 moles/liter (the initiator solution was further diluted from a commercially available from Aldrich Chemical, Milwaukee, Wis. having a molarity of 1.3 moles/liter) was added dropwise to the reaction flask.

The reaction mixture was cooled to −78° C. and 3.00 pbw styrene (S) was added. Polymerization was allowed to proceed for 1 hour at −78° C. The sequential addition and polymerization of tBA, in the amount indicated in Table 3, and 0.59 pbw EGDMA (for a molar ratio of EGDMA to Li of 10:1) was carried out under the same conditions to link the living diblocks into a star structure.

The resulting copolymer was quenched with degassed methanol (commercially available from Aldrich Chemical, Milwaukee, Wis.) and precipitated by addition to a 90/10 (by volume) mixture of methanol/water while stirring. The copolymer was then dried overnight under vacuum at 60–80° C.

TABLE 3

| (S-tBA)n Polymer No. | tBA (pbw) |
|---|---|
| A | 30.00 |
| B | 21.00 |

Step II: Preparation of (S-iOA)n Star Block Copolymer from the (S-tBA)n Star Block Copolymer The same general procedure was used for the transalcoholysis of each of the eight copolymers prepared in Step I. In a glass flask, 10.0 pbw (S-tBA)n was dissolved in 164 pbw iso-octyl alcohol (commercially available from Exxon, Houston, Tex.) and 0.50 pbw PTSA. The mixture was refluxed at 150° C. for 48 hours. Then, the copolymer was precipitated in methanol and dried overnight under vacuum at 80° C. The resulting (S-iOA)n star block copolymers and the molecular weights and polydispersity values thereof are described in Table 4.

TABLE 4

| (S-iOA)n Polymer No. | Molecular Weight | Polydispersity Value |
|---|---|---|
| 6A | $(10–100)_{2.7}$ | 1.12 |
| 6B | $(10–70)_{3.3}$ | 1.15 |

Examples 7–13

Formulation and Testing of (Meth)acrylate Block Copolymer PSA Tapes

Examples 7A–7I (Meth)acrylic block copolymer 1C from Example 1 was formulated into a PSA by combining the block copolymer with one or more tackifying resins at the tackifier levels shown in Table 5. The tackifier levels are shown in phr, parts by weight based on 100 parts by weight block copolymer.

The tackifiers used were FORAL 105 and REGALREZ 1018. The tackifier(s) were added to a solution of the block copolymer in toluene (30–40% solids by weight) and mixed. The resulting PSA composition was knife-coated to a dry thickness of about 25 micrometers (1 mil) on 38-micrometer (1.5 mil)-thick PET film. The coatings were placed in a 65° C. oven to dry for 15 minutes and then conditioned for 24 hours at a constant temperature (about 22° C.) and humidity (about 50% relative humidity) before testing.

TABLE 5

| Example No. | FORAL 105 (phr) | REGALREZ 1018 (phr) | % Block Copolymer (Based on Total Weight of the PSA Composition) |
|---|---|---|---|
| 7A | 69 | 54 | 45 |
| 7B | 67 | 15 | 55 |
| 7C | 101 | 21 | 45 |
| 7D | 95 | 0 | 51 |
| 7E | 83 | 17 | 50 |
| 7F | 86 | 46 | 43 |
| 7G | 80 | 0 | 56 |
| 7H | 62 | 38 | 50 |
| 7I | 103 | 0 | 49 |

TABLE 6

| | 180° Peel Strength | | Shear Strength, Room |
|---|---|---|---|
| Example No. | Glass (N/dm) | PE (N/dm) | Temperature (minutes) |
| 7A | 43.3 | 32.2 | >10,000 |
| 7B | 53.6 | 34.6 | >10,000 |
| 7C | 72.2 | 21.9 | >10,000 |
| 7D | 68.5 | 17.5 | >10,000 |
| 7E | 54.7 | 22.8 | >10,000 |
| 7F | 75.5 | 52.5 | >10,000 |
| 7H | 43.3 | 43.3 | 9,730 |

Examples 8A–8C (Meth)acrylic block copolymer 1A from Example 1 was formulated into a PSA by combining the block copolymer with a plasticizer and a tackifying resin, coating, drying and conditioning as described in Example 7. The plasticizer used was PLASTHALL DIODD and the tackifying resin was REGALREZ 3102. The plasticizer and tackifier levels are shown in Table 7. These levels are shown in phr, parts by weight based on 100 parts by weight block copolymer.

TABLE 7

| Example No. | PLASTHALL DIODD (phr) | REGALREZ 3102 (phr) | % Block Copolymer (Based on Total Weight of the PSA Composition) |
|---|---|---|---|
| 8A | 39 | 111 | 40 |
| 8B | 15 | 85 | 50 |
| 8C | 0 | 69 | 60 |

TABLE 8

| | 180° Peel Strength | | Shear Strength, Room |
|---|---|---|---|
| Example No. | Glass (N/dm) | PE (N/dm) | Temperature (minutes) |
| 8A | 26.7 | 19.7 | >10,000 |
| 8B | 25.8 | 2.6 | >10,000 |
| 8C | 6.5* | 0.4 | >10,000 |

*Tested using a peel rate of 228 centimeters per minute

Examples 9A–9E

A series of block copolymers prepared in Example 1 (Polymers 1D-1H) were formulated into PSA compositions by combining the block copolymer with one or more tackifying resins, coating, drying, and conditioning as described in Example 7. The tackifiers used were FORAL 105 and REGALREZ 1018. The tackifier levels are shown in phr, parts by weight based on 100 parts by weight block copolymer.

TABLE 9

| Example No. | Block Copolymer From Example 1 | FORAL 105 (phr) | REGALREZ 1018 (phr) | % Block Copolymer (Based on Total Weight of the PSA Composition) |
|---|---|---|---|---|
| 9A | 1D | 79 | 21 | 50 |
| 9B | 1E | 87 | 13 | 50 |
| 9C | 1F | 79 | 21 | 50 |
| 9D | 1G | 83 | 18 | 50 |
| 9E | 1H | 87 | 13 | 50 |

TABLE 10

| | 180° Peel Strength | | Shear Strength, Room |
|---|---|---|---|
| Example No. | Glass (N/dm) | PE (N/dm) | Temperature (minutes) |
| 9A | 55.4 | 11.2 | >10,000 |
| 9B | 59.1 | 28.4 | >10,000 |
| 9C | 59.1 | 32.8 | >10,000 |
| 9D | 74.4 | 41.6 | 3,810 |
| 9E | 65.6 | 49.2 | 1,631 |

Examples 10A–10E

The star block copolymer prepared in Example 5 was formulated into PSA compositions by combining the block copolymer with one or more tackifying resins, coating, drying, and conditioning as described in Example 7. The tackifiers used were FORAL 105 and REGALREZ 1018. Tackifier levels are shown in phr, parts by weight based on 100 parts by weight block copolymer.

TABLE 11

| Example No. | FORAL 105 (phr) | REGALREZ 1018 (phr) | % Block Copolymer (Based on Total Weight of the PSA Composition) |
|---|---|---|---|
| 10A | 81 | 41 | 45 |
| 10B | 64 | 86 | 40 |
| 10C | 102 | 48 | 40 |
| 10D | 64 | 36 | 50 |
| 10E | 94 | 6 | 50 |

TABLE 12

| Example No. | 180° Peel Strength Glass (N/dm) | 180° Peel Strength PE (N/dm) | Shear Strength, Room Temperature (minutes) |
|---|---|---|---|
| 10A | 52.5 | 52.5 | >10,000 |
| 10B | 44.9 | 45.9 | >10,000 |
| 10C | 70.0 | 36.1 | >10,000 |
| 10D | 49.2 | 42.7 | >10,000 |
| 10E | 66.7 | 31.7 | >10,000 |

Examples 11A–11B

The star block copolymers prepared in Example 6 were formulated into PSA compositions by combining the block copolymer with one or more tackifying resins, coating, drying, and conditioning as described in Example 7. The tackifiers used were FORAL 105 and REGALREZ 1018. Tackifier levels are shown in phr, parts by weight based on 100 parts by weight block copolymer.

TABLE 13

| Example No. | Block Copolymer From Example 6 | FORAL 105 (phr) | REGALREZ 1018 (phr) | % Block Copolymer (Based on Total Weight of the PSA Composition) |
|---|---|---|---|---|
| 11A | 6A | 85 | 15 | 50 |
| 11B | 6B | 83 | 18 | 50 |

TABLE 14

| Example No. | 180° Peel Strength Glass (N/dm) | 180° Peel Strength PE (N/dm) | Shear Strength, Room Temperature (minutes) |
|---|---|---|---|
| 11A | 63.7 | 39.2 | 1715 |
| 11B | 37.9 | 19.3 | >10,000 |

Examples 12A–12D (Meth)acrylic block copolymer 1C from Example 1 was blended with a MMA-iOA (10–140) diblock copolymer and formulated into a PSA composition by combining the block copolymer with tackifying resins, coating, drying, and conditioning as described in Example 7. The tackifiers used were FORAL 105 and REGALREZ 1018. Amounts of each component are shown in Table 15. Tackifier levels are shown in phr, parts by weight based on 100 parts by weight block copolymer.

TABLE 15

| Example No. | Diblock (phr) | FORAL 105 (phr) | REGALREZ 1018 (phr) | % Block Copolymer (Based on Total Weight of the PSA Composition) |
|---|---|---|---|---|
| 12A | 20 | 83 | 17 | 45 |
| 12B | 40 | 84 | 16 | 42 |
| 12C | 60 | 84 | 16 | 38 |
| 12D | 80 | 85 | 15 | 36 |

TABLE 16

| Example No. | 180° Peel Strength Glass (N/dm) | 180° Peel Strength PE (N/dm) | Shear Strength, Room Temperature (minutes) |
|---|---|---|---|
| 12A | 66.7 | 39.4 | >10,000 |
| 12B | 71.1 | 39.4 | >10,000 |
| 12C | 73.3 | 43.8 | >10,000 |
| 12D | 79.9 | 41.6 | >10,000 |

Examples 13A–13B (Meth)acrylic block copolymer 1B from Example 1 was formulated into PSA compositions by combining the block copolymer with one or more a tackifying resins and/or a plasticizer resin, coating, drying, and conditioning as described in Example 7. The plasticizer used was PLASTHALL DIODD and the tackifying resins used were FORAL 105 and REGALREZ 1018. Tackifier levels are shown in phr, parts by weight based on 100 parts by weight block copolymer. Amounts of each component are shown in Table 17.

TABLE 17

| Example No. | FORAL 105 (phr) | PLASTHALL DIODD (phr) | REGALREZ 1018 (phr) | % Block Copolymer (Based on Total Weight of the PSA Composition) |
|---|---|---|---|---|
| 14A | 81 | 0 | 41 | 45 |
| 14B | 99 | 23 | 0 | 45 |

TABLE 18

| Example No. | 180° Peel Strength Glass (N/dm) | 180° Peel Strength PE (N/dm) | Shear Strength, Room Temperature (minutes) |
|---|---|---|---|
| 14A | 81.0 | 30.6 | >10,000 |
| 14B | 33.9 | 44.9 | 1,281 |

Example 14

Samples of the block copolymers prepared in Example 1G and Example 2 were tested for comparison with the block copolymers prepared in Comparative Examples 2 and 4, infra.

TABLE 19

| Example No. | Block Copolymer (Molecular Weight) | Tensile at Break (MPa) | % Elongation |
|---|---|---|---|
| 1G | MMA-iOA-MMA (7-100-7) | 3.6 | 490 |
| Comparative 4 | MMA-iOA-MMA (7-100-7) | 0.4 | 520 |
| 2 | MMA-nBA-MMA (10-80-10) | 9.3 | 712 |
| Comparative 2 | MMA-nBA-MMA (8.2-77-8.2) | 0.7 | 494 |

Example 15

Several of the PSA formulations prepared in the previous examples and in the comparative examples, infra, were tested according to the 60° C. shear displacement test method.

TABLE 20

| Example No. | Elastomer Description | Total Tackifier Level (phr) | Tackifiers Used (phr) | Shear Displacement, 60° C. for 1 hour (millimeters) |
|---|---|---|---|---|
| 7E | MMA-iOA-MMA (10-143-10) | 100 | FORAL 105 (83) REGALREZ 1018 (17) | 0.0 |
| 10A | (MMA-iOA)$_n$ (10-100)$_{3.8}$ | 122 | FORAL 105 (81) REGALREZ 1018 (41) | 0.0 |
| 12B | MMA-iOA-MMA (10-143-10) | 100* | FORAL 105 (84) REGALREZ 1018 (16) | 0.0 |
| Comparative 5 | MMA-nBA-MMA (16.5-77-16.5) | 25 | SUPERESTER A-100 | 0.1 |
|  |  | 25 | SCHENECTADY SP553 | 0.1 |
| Comparative 6 | MMA-nBA-MMA (8.2-77-8.2) | 25 | SUPERESTER A-100 | failed cohesively in 6 minutes |
|  |  | 25 | SCHENECTADY SP553 | failed cohesively in 18 minutes |
| Comparative 7 | MMA-iOA-MMA (7-70-7) | 25 | SUPERESTER A-100 | 0.5 |
|  |  | 25 | SCHENECTADY SP553 | failed cohesively in 53 minutes |
| Comparative 8 | MMA-iOA-MMA (7-100-7) | 25 | SUPERESTER A-100 | failed cohesively in 54 minutes |
|  |  | 25 | Schenectady SP553 | failed cohesively in 42 minutes |
| Comparative 7 | MMA-iOA-MMA (7-70-7) | 100 | SUPERESTER A-100 | 1.0 |
|  |  | 100 | SCHENECTADY SP553 | 1.0 |
| Comparative 8 | MMA-iOA-MMA (7-100-7) | 100 | SUPERESTER A-100 | failed cohesively in 3 minutes |
|  |  | 100 | Schenectady SP553 | 2.0 |

*also contained 40 phr of MMA-iOA (10-140) diblock copolymer additive

Comparative Examples

The following comparative examples were prepared and tested according to the procedures illustrated in Japanese Patent Publication No. 10-25,459 (Sekisui).

Comparative Examples 1–4

Synthesis of Block Copolymers Using Photoiniferter Polymerization

Comparative Example 1

Synthesis of MMA-nBA-MMA Block Copolymer

To obtain a MMA-nBA-MMA copolymer having a theoretical molecular weight of about 110,000 grams per mole and theoretical molecular weights of the blocks of 16.5-77-16.5, the following procedure was used. In three-necked, round-bottom flask, fitted with a water-cooled condenser, a mechanical stirrer and a nitrogen inlet was placed 140 pbw nBA, 60 pbw ethyl acetate (commercially available from Aldrich Chemical, Milwaukee, Wis.) and 0.73 pbw XDC. The reaction flask and its contents were then purged with a nitrogen flow of about 1 liter/minute for about 20 minutes, after which the nitrogen flow was reduced and a slightly positive pressure was maintained in the flask.

The entire apparatus was exposed to a set of three 40 Watt ultraviolet blacklight bulbs (Model No. F40BL, commercially available from Sylvania Lighting Services; Danvers, Mass.) that were positioned about 15 centimeters from the flask wall with an average intensity of about 2 to 4 milliwatts per square centimeter. During the course of the reaction, additional ethyl acetate was added, giving a 40% solids solution.

The progress of the reaction was monitored using gas chromatography. Once the n-butyl acrylate was consumed, 60 pbw MMA was added. Again, the reaction was monitored by gas chromatography. Once the MMA was consumed, the light bulbs were shut off and the solution was removed from the reaction flask.

The block copolymer was then dried in a 65° C. oven for 15 minutes. The dried block copolymer was slightly hazy to the unaided human eye and had a polydispersity value of 1.95.

Comparative Example 2

Synthesis of MMA-nBA-MMA Block Copolymer

The same procedure was followed as outlined in Comparative Example 1, except that the reagents used were 140 pbw nBA, 210 pbw ethyl acetate, 0.73 pbw XDC, and 30 pbw MMA. The resulting MMA-nBA-MMA copolymer had a theoretical molecular weight of about 93,400 grams per mole and the theoretical molecular weights of the blocks were 8.2-77-8.2. Then, the block copolymer was dried in a 65° C. oven for fifteen minutes. The measured polydispersity value was 1.74.

Comparative Example 3

Synthesis of MMA-iOA-MMA Block Copolymer

To prepare a MMA-iOA-MMA block copolymer having a theoretical molecular weight of about 84,000 grams per mole and theoretical molecular weights of the blocks of 7-70-7, the following procedure was used. The was the procedure used in Comparative Example 2, except that the reagents used were 140 pbw iOA, 200 pbw ethyl acetate, 0.80 pbw XDC, and 28 pbw MMA. The measured polydispersity value was 2.07.

Comparative Example 4

Synthesis of MMA-iOA-MMA Block Copolymer

To prepare a MMA-iOA-MMA copolymer having a theoretical molecular weight of about 114,000 grams per mole and theoretical molecular weights of the blocks of 7-100-7, the following procedure was used. This was the procedure used in Comparative Example 2, except that the reagents used were 140 pbw iOA, 200 pbw ethyl acetate, 0.56 pbw XDC, and 19.6 pbw MMA. Then, the block copolymer was dried in a 65° C. oven for fifteen minutes. The dried block copolymer was clear and tacky to the touch. The measured polydispersity value was 2.39.

Comparative Examples 5–8

Formulation and Testing of (Meth)acrylate Block Copolymer PSA Tapes Using Block Copolymers Synthesized Using Photoiniferter Polymerization

Comparative Example 5

The copolymer prepared in Comparative Example 1 (except solvent was not removed by drying) was formulated into a PSA by mixing a tackifier with the block copolymer. The tackifiers and amounts used are shown in Table C1. Each of the samples was solvent-coated using a knife and placed in a 65° C. oven for 15 minutes to dry.

TABLE C1

| Tackifier | Tackifier level (phr) | 180° Peel Strength, Glass (N/dm) | Shear Strength, Room Temperature (minutes) |
|---|---|---|---|
| SUPERESTER A-100 | 25 | 42.3 | 363 |
| SUPERESTER A-100 | 100 | 1.5 | >5,000 |
| SCHENECTADY SP553 | 25 | 33.6 | 1,819 |
| SCHENECTADY SP553 | 100 | 0.9 | Does not stick |

Comparative Example 6

The same procedure was followed as in Comparative Example 5, except that the block copolymer used was the block copolymer prepared in Comparative Example 2.

TABLE C2

| Tackifier | Tackifier level (phr) | 180° Peel Strength, Glass (N/dm) | Shear Strength, Room Temperature (minutes) |
|---|---|---|---|
| SUPERESTER A-100 | 25 | 90.5 | 53 |
| SUPERESTER A-100 | 100 | 2-bond failure | 1,191 |
| SCHENECTADY SP553 | 25 | 58.4 | 144 |
| SCHENECTADY SP553 | 100 | 2-bond failure | >5,000 |

Comparative Example 7

The same procedure was followed as in Comparative Example 5, except that the block copolymer used was the block copolymer prepared in Comparative Example 3.

TABLE C3

| Tackifier | Tackifier level (phr) | 180° Peel Strength, Glass (N/dm) | Shear Strength, Room Temperature (minutes) |
|---|---|---|---|
| SUPERESTER A-100 | 25 | 2 bond failure | 48 |
| SUPERESTER A-100 | 100 | 2 bond failure | 4,344 |
| SCHENECTADY SP553 | 25 | 73.0 | 82 |
| SCHENECTADY SP553 | 100 | 2 bond failure | 7,170 |

Comparative Example 8

The same procedure was followed as in Comparative Example 5, except that the block copolymer used was the block copolymer prepared in Comparative Example 4.

TABLE C4

| Tackifier | Tackifier level (phr) | 180° Peel Strength (N/dm) | Shear Strength, Room Temperature (minutes) |
|---|---|---|---|
| SUPERESTER A-100 | 25 | 2 bond failure | 25 |
| SUPERESTER A-100 | 100 | 2 bond failure | 122 |
| SCHENECTADY SP553 | 25 | 2 bond failure | 62 |
| SCHENECTADY SP553 | 100 | 2 bond failure | 1,450 |

Various modifications and alterations of this invention will become apparent to those skilled in the art without departing from the scope and spirit of the invention. It should be understood that this invention is not limited to the illustrative embodiments set forth herein.

What is claimed is:

1. A hot-melt processable adhesive composition comprising:

at least one block copolymer comprising at least two A blocks and at least one B block, wherein the A block is derived from at least one monoethylenically unsaturated monomer selected from the group consisting of (meth)acrylates, styrenes and vinyl esters, and wherein the B block is derived from at least one monoethylenically unsaturated monomer selected from the group consisting of (meth)acrylates, acrylamides and vinyl esters, wherein the boundaries between microdomains comprising the A blocks and a continuous phase comprising the B blocks are essentially free of tapered structures; wherein the adhesive composition has a cohesive strength of at least about 2,000 minutes when measured according to ASTM D 3654.

2. A hot-melt processable adhesive composition comprising:
at least one block copolymer comprising at least two A blocks and at least one B block, wherein the A block is derived from at least one monomethylenically unsaturated monomer selected from the group consisting of (meth)acrylates, styrenes and vinyl esters, and wherein the B block is derived from at least one monoethylenically unsaturated monomer selected from the group consisting of (meth)acrylates, acrylamides and vinyl esters, and wherein the boundaries between microdomains comprising the A blocks and a continuous phase comprising the B blocks are essentially free of tapered structures; wherein the block copolymer is polymerized via a living polymerization method.

3. A composition comprising:
at least one block copolymer comprising at least two A blocks and at least one B block, wherein the A block is derived from at least one monoethylenically unsaturated monomer selected from the group consisting of (meth)acrylates, styrenes and vinyl esters, and wherein the B block is derived from at least one monoethylenically unsaturated monomer selected from the group consisting of(meth)acrylates, acrylamides and vinyl esters, and wherein the boundaries between microdomains comprising the A blocks and a continuous phase comprising the B blocks are essentially free of tapered structures; wherein the composition is a hot-melt processable adhesive and has a zero shear displacement when tested according to Shear Displacement test described herein.

4. A hot-melt processable adhesive composition comprising:
at least one block copolymer comprising at least two A blocks and at least one B block, wherein the A block is derived from at least one monoethylenically unsaturated monomer selected from the group consisting of (meth)acrylates, styrenes and vinyl esters, and wherein the B block is derived from at least one monoethylenically unsaturated monomer selected from the group consisting of (meth)acrylates, acrylamides and vinyl esters, and wherein the boundaries between microdomains comprising the A blocks and a continuous phase comprising the B blocks are essentially free of tapered structures, and the polydispersity of the block copolymer is about 1.5 or less.

5. The composition of claim 4, wherein polydispersity of the block copolymer is about 1.2 or less.

6. A hot-melt processable adhesive composition comprising:
at least one block copolymer comprising at least two A blocks and at least one B block, wherein the A block is derived from at least one monoethylenically unsaturated monomer selected from the group consisting of (meth)acrylates, styrenes and vinyl esters, and wherein the B block is derived from at least one monoethylenically unsaturated monomer selected from the group consisting of(meth)acrylates, acrylamides and vinyl esters, and wherein the A blocks are each essentially free of segments derived from a monomer used to prepare the B block and wherein the B block is essentially free of segments derived from a monomer used to prepare the A blocks and the boundaries between microdomains comprising the A blocks and a continuous phase comprising the B blocks are essentially free of tapered structures.

7. A hot-melt processable adhesive composition comprising:
at least one block copolymer comprising at least two A blocks and at least one B block, wherein the A block is derived from at last one monoethylenically unsaturated monomer selected from the group consisting of (meth) acrylates, styrenes and vinyl esters, and wherein the B block is derived from at least one monoethylenically unsaturated monomer selected from the group consisting of (meth)acrylates, acrylamides and vinyl esters, and wherein the block copolymer is essentially free of iniferter residue and the boundaries between microdomains comprising the A block and a continuous phase comprising the B blocks are essentially fee of tapered structures.

8. A hot-melt processable adhesive composition comprising:
at least one star block copolymer comprising A blocks and B blocks, wherein the A and B blocks are derived from monoethylenically unsaturated monomers, and wherein block copolymers in the composition consist essentially of the star block copolymer.

9. The composition of claim 1, wherein the composition comprises an (A-B-A) triblock copolymer and an (A-B) diblock copolymer.

10. The composition of claim 1, wherein the block copolymer comprises at least one of: (A-B-A) triblocks, $-(A-B)_n-$ multiblocks, $(A-B)_n-$ star blocks, and combinations thereof.

11. The composition of claim 1, wherein the block copolymer is a linear block copolymer.

12. The composition of claim 8, wherein the A blocks are polymers independently derived from a monoethylenically unsaturated monomer, which as a homopolymer has a glass transition temperature (Tg) of greater than about 20° C.

13. The composition of claim 12, wherein the monoethylenically unsaturated monomer is a (meth)acrylate monomer.

14. The composition of claim 8, wherein the B block is a polymer derived from a monoethylenically unsaturated monomer, which as a homopolymer has a glass transition temperature (Tg) of less than about 20° C.

15. The composition of claim 8, wherein the B block is a polymer derived from a (meth)acrylate monomer.

16. The composition of claim 8, wherein the A blocks and B block are each independently derived from a monomer having a structure as follows:

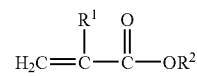

wherein:
$R^1$ is H or $CH_3$; and
$R^2$ is a hydrocarbon group, such that $R^2$ for each A block has a total number of carbon atoms differing by at least two from $R^2$ for the B block.

* * * * *

UNITED STATES PATENT AND TRADEMARK OFFICE
CERTIFICATE OF CORRECTION

PATENT NO.       : 7,084,209 B2
APPLICATION NO.  : 10/838312
DATED            : August 1, 2006
INVENTOR(S)      : Albert I. Everaerts It is certified that error appears in the above-identified patent and that said Letters Patent is hereby corrected as shown below:

Col. 3
Line 10, delete "Exemplifed" and insert -- Exemplified --, therefor.

Col. 7
Line 33, before "Elastomeric" delete """.

Col. 19
Line 12, delete "(S-iOA)n" and insert -- $(S-iOA)_n$ --, therefor.
Line 45, delete "de" and isnert -- dé --, therefor.

Col. 23
Line 37, delete "MMA-iOA)$_n$" and insert -- $(MMA-iOA)_n$ --, therefor.

Col. 34
Line 21, in Claim 7, delete "fee" and insert -- free --, therefor.

Signed and Sealed this

Twenty-second Day of May, 2007

JON W. DUDAS
*Director of the United States Patent and Trademark Office*